W. R. WALTON.
Hand Truck.

No. 230,844.  Patented Aug. 3, 1880.

Witnesses:  Inventor;
Chas. O. Gill  Wm. R. Walton,
J. W. Ryan  By his Attys,
 Cox and Cox

UNITED STATES PATENT OFFICE.

WILLIAM R. WALTON, OF FREEPORT, ILLINOIS, ASSIGNOR OF ONE-HALF OF HIS RIGHT TO PETER S. KAHLY.

HAND-TRUCK.

SPECIFICATION forming part of Letters Patent No. 230,844, dated August 3, 1880.

Application filed December 17, 1879.

*To all whom it may concern:*

Be it known that I, WILLIAM R. WALTON, of Freeport, in the county of Stephenson and State of Illinois, have invented a new and useful Improvement in Store-Trucks, of which the following is a specification, reference being had to the accompanying drawings.

The invention relates to an improvement in store-trucks; and it consists in a truck the body of which may be raised or lowered and secured in such position by novel means, as hereinafter described, and pointed out in the claim.

The object of the invention is to provide a truck upon which heavy articles may be placed without a great deal of labor, and after transportation be removed with but slight exertion.

Figure 1:
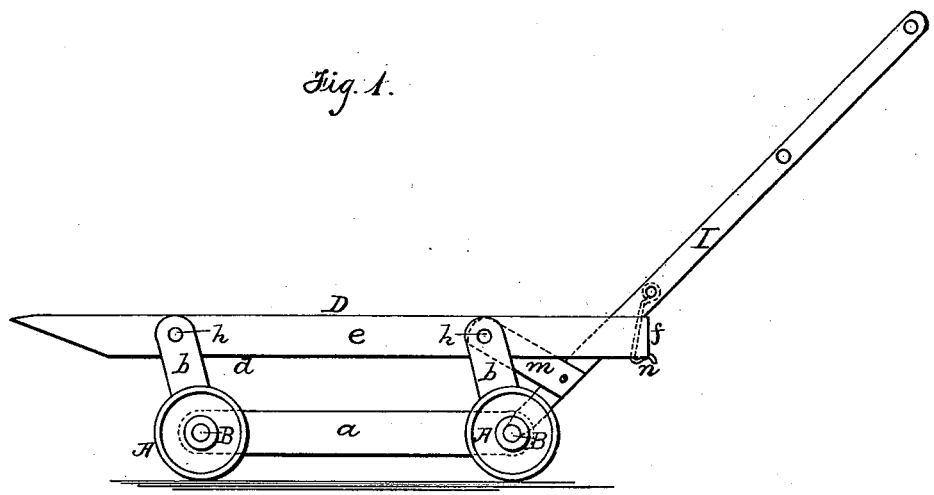
Figure 2:
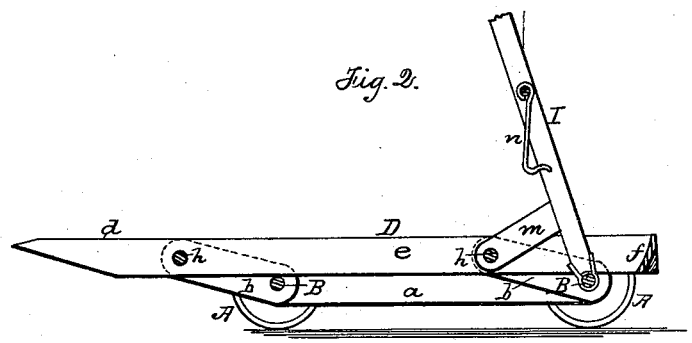
Figure 3:
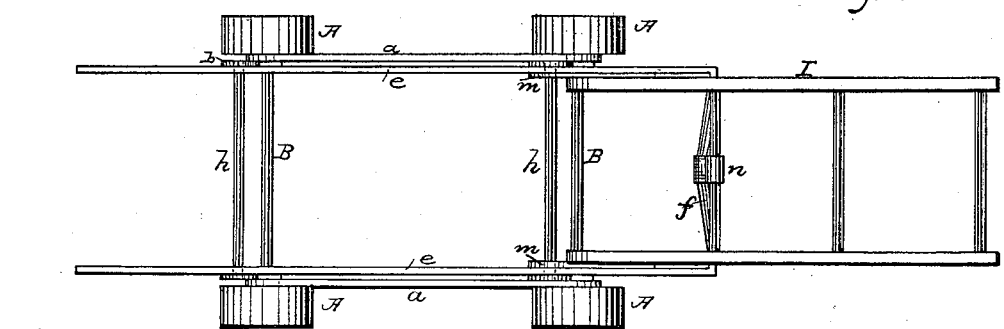

Referring to the accompanying drawings, Figure 1 is a side elevation of a device embodying the elements of the invention. Fig. 2 is a central vertical longitudinal section, and Fig. 3 a top view, of same.

A indicates the supporting-wheels of the truck, connected by the axles B, which, upon the inside of the wheels, have their ends connected and braced by the bars $a$. The purpose of the bars $a$ is to prevent the axles spreading apart when the truck is being used, and it is obvious that this object could be secured if the said bars were on the outside of the wheels A instead of on the inside.

The body or bed D of the truck is supported above the wheels A by the standards $b$, the upper ends of which are pivoted in corresponding positions on opposite sides of the body D, while the lower ends are mounted upon the axles B close to the wheels A. Both ends of the standards $b$ are loosely secured, so as to turn upon their bearings, and thus permit the body D to be moved longitudinally a given distance, according to the length of the standards.

The body D consists in the present instance of a single wrought-iron bar, $d$, bent to form the two corresponding sides $e$ and a front end, $f$. The rear ends of the sides $e$ extend a suitable distance beyond the rear axle B, and are beveled on their under sides to permit the rolling of a barrel or other article upon them when they are resting upon the floor. The pivots $h$, which secure the upper ends of the standards $b$, extend across the body D, and serve to brace and strengthen it.

Upon the front axle B is mounted the lower end of the handle I of the truck, the other end of which handle extends upward a suitable distance between the sides of the body D to completely fulfill its purpose, and is connected a short distance above its lower end with the front pivot, $h$, by the bars $m$.

Between the sides of the handle I is pivotally or otherwise secured at a proper point the swinging hook or catch $n$, which, when the body D is in an elevated position, hooks beneath the front end, $f$, and prevents the said body from being lowered. The body D is raised when the upper part of the handle I is pushed frontward by the bars $m$, acting through the pivot $h$. When the upper part of the handle I is pushed frontward the swinging catch or hook $n$ falls behind the end $f$ automatically and holds the body D in an elevated position. To lower the body D it is simply necessary to disengage the catch $n$, when the weight on the said body will cause it to lower.

It is designed to lower the body D, and, when necessary, to tilt it upon the beveled portion of its rear end when a heavy article is to be rolled or placed upon it, and then to elevate the body clear of the wheels and transport the said article to the place desired, again lowering the body when the article is to be removed.

What I claim as my invention, and desire to secure by Letters Patent, is—

A store-truck composed of the body D, made from a single bar of metal, forming sides $e$ and end $f$, the swinging standards $b$, the side bars, $a$, wheels A, handle I, mounted upon the front axle B and extending upward between the sides of the body D, the catch $n$, and bars $m$, substantially as specified.

In testimony that I claim the foregoing improvement in store-trucks, as above described, I have hereunto set my hand this 25th day of November, 1879.

WILLIAM R. WALTON.

Witnesses:
R. H. WILES,
T. W. JOHNSON.